US012680854B2

(12) United States Patent
Agati et al.

(10) Patent No.: US 12,680,854 B2
(45) Date of Patent: Jul. 14, 2026

(54) DISPENSER OF A FLUID SUBSTANCE

(71) Applicant: BORMIOLI PHARMA S.P.A., Milan (IT)

(72) Inventors: Matteo Agati, Milan (IT); Andrea Maldifassi, Milan (IT); Riccardo Trabattoni, Seregno (IT)

(73) Assignee: BORMIOLI PHARMA S.P.A., Milan (IT)

( * ) Notice: Subject to any disclaimer, the term of this patent is extended or adjusted under 35 U.S.C. 154(b) by 149 days.

(21) Appl. No.: 18/700,121

(22) PCT Filed: Oct. 19, 2022

(86) PCT No.: PCT/IB2022/060054
§ 371 (c)(1),
(2) Date: Apr. 10, 2024

(87) PCT Pub. No.: WO2023/067516
PCT Pub. Date: Apr. 27, 2023

(65) Prior Publication Data
US 2024/0271978 A1 Aug. 15, 2024

(30) Foreign Application Priority Data

Oct. 21, 2021 (IT) ........................ 102021000027071

(51) Int. Cl.
| | |
|---|---|
| *G01F 11/26* | (2006.01) |
| *A61J 1/22* | (2006.01) |
| *A61J 7/00* | (2006.01) |

(52) U.S. Cl.
CPC .............. *G01F 11/263* (2013.01); *A61J 1/22* (2013.01); *A61J 7/0053* (2013.01)

(58) Field of Classification Search
CPC ........... G01F 11/263; A61J 7/0053; A61J 1/22
See application file for complete search history.

(56) References Cited

U.S. PATENT DOCUMENTS

| | | | | | |
|---|---|---|---|---|---|
| 2,282,110 | A | * | 5/1942 | Angell | .................... G01F 11/16 |
| | | | | | 222/308 |
| 2,339,644 | A | * | 1/1944 | Lucas | .................... G01F 19/00 |
| | | | | | 222/425 |

(Continued)

FOREIGN PATENT DOCUMENTS

| | | |
|---|---|---|
| EP | 0426403 | 5/1991 |
| JP | 5-886520 | 6/2012 |
| KR | 101679261 | 11/2016 |

OTHER PUBLICATIONS

International Search Report and Written Opinion, issued on Dec. 6, 2022 in PCT/IB2022/060054, 8 pages.

*Primary Examiner* — Frederick C Nicolas
(74) *Attorney, Agent, or Firm* — Chrisman Gallo Tochtrop LLC

(57) ABSTRACT

A dispenser of a fluid substance includes: a container of the fluid substance; a measuring cup for dosing the fluid substance to be dispensed; a first line for the fluid-dynamic connection between the measuring cup and the container for the transit of the fluid substance; a second line for the fluid-dynamic connection between the measuring cup and the container for the transit of air; a valve movable between a first configuration in which it allows the fluid-dynamic connection between the container and the measuring cup by the first and the second connection line and a second configuration in which it prevents the fluid-dynamic connection between the container and the measuring cup by the first and the second connection line; and an actuator for operating the valve, the actuator being operable by a user.

11 Claims, 3 Drawing Sheets

(56)     References Cited

U.S. PATENT DOCUMENTS

| | | | | |
|---|---|---|---|---|
| 2,815,153 A * | 12/1957 | Mccarthy | ............... | A47G 19/34 |
| | | | | 222/452 |
| 3,130,874 A * | 4/1964 | Bulmer | .................. | A47G 19/34 |
| | | | | 222/443 |
| 3,141,579 A * | 7/1964 | Medlock | ............... | G01F 11/263 |
| | | | | 222/207 |
| 3,578,209 A * | 5/1971 | Fraser | .................. | A01K 5/0291 |
| | | | | 222/650 |
| 3,670,928 A * | 6/1972 | Hanson | ................... | G01F 11/18 |
| | | | | 222/308 |
| 3,814,286 A * | 6/1974 | Welsh | ...................... | A61C 5/68 |
| | | | | 222/43 |
| 4,314,657 A * | 2/1982 | Perakis | ................. | G01F 11/263 |
| | | | | 222/453 |
| 5,123,572 A * | 6/1992 | Ford | ...................... | A47G 19/34 |
| | | | | 222/308 |
| 5,746,355 A * | 5/1998 | Wold | ..................... | A47G 19/34 |
| | | | | 222/441 |
| 6,244,470 B1 * | 6/2001 | Harley-Wilmot | ....... | G01F 11/38 |
| | | | | 222/158 |
| 6,877,639 B1 * | 4/2005 | Hanson | ................. | G01F 11/261 |
| | | | | 222/207 |
| 7,097,071 B2 * | 8/2006 | Anderson | ............. | G01F 11/286 |
| | | | | 222/442 |
| 11,040,146 B2 * | 6/2021 | Weibel | .................... | F04B 13/00 |
| 11,320,294 B2 * | 5/2022 | Battle | ....................... | A61J 1/22 |
| 2010/0286650 A1 * | 11/2010 | Fitzgerald | ............. | A61J 1/1412 |
| | | | | 604/249 |
| 2020/0297935 A1 | 9/2020 | Weibel et al. | | |
| 2021/0063220 A1 | 3/2021 | Battle et al. | | |

\* cited by examiner

DISPENSER OF A FLUID SUBSTANCE

TECHNICAL FIELD

The present invention relates to a dispenser of a predosed amount of a fluid substance, typically a nutraceutical or pharmaceutical or food substance. For example, it could be a liquid or a viscous substance such as a syrup.

BACKGROUND ART

Solutions are known in which to dose the fluid substance, an operator opens a container of such substance and pours it into a separate measuring cup in which a graduated scale is shown.

One drawback of such a solution is that in order to carry out such an operation, the user must pay particular attention. In fact, there is a risk of spilling part of the content outside the measuring cup (a particularly undesirable situation, especially if the substance is a viscous and sticky syrup). A further drawback is connected to the fact that if the user erroneously dispenses an excessive amount of substance, the reverse operation to reintroduce it into the container would be rather complex to perform.

DISCLOSURE OF THE INVENTION

In this context, the technical task underlying the present invention is to propose an ergonomic dispenser which allows to facilitate the operation of dosing a predetermined amount of product and its intake. This is in order to facilitate the dosing and intake operation in the case of elderly people, with reduced hand motor capacity or which is compromised by shaking or other or more simply to make it more convenient and faster for a user.

The technical task set and the objects specified are substantially attained by a dispenser comprising the technical features as set out in one or more of the appended claims

BRIEF DESCRIPTION OF DRAWINGS

Further features and advantages of the present invention will become more apparent from the approximate and thus non-limiting description of a preferred, but not exclusive, embodiment of a dispenser, as illustrated in the accompanying drawings, in which.

DETAILED DESCRIPTION OF PREFERRED EMBODIMENTS OF THE INVENTION

Figures 1, 2:
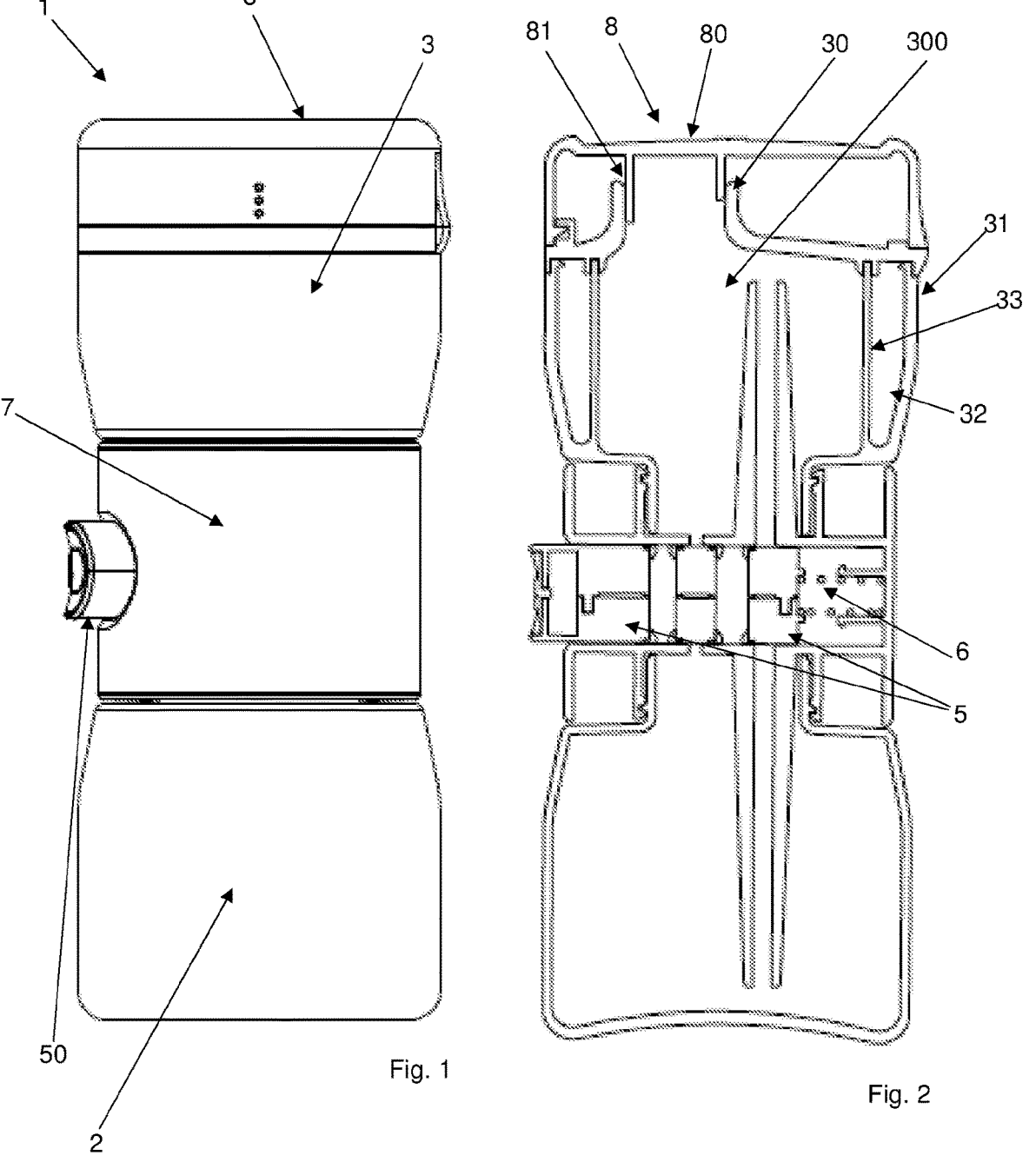
FIG. 1 shows a lateral view of a dispenser according to the present invention.
FIG. 2 shows a sectional view of the dispenser of FIG. 1.

In the appended figures of the drawings, reference numeral 1 denotes a dispenser of a fluid substance. The dispenser 1 comprises a container 2 of the fluid substance. As mentioned above, such a fluid substance can be a liquid or a dense substance such as a syrup. Typically, the fluid substance is a pharmaceutical or nutraceutical or food substance.

The dispenser 1 suitably comprises a measuring cup 3 for dosing the fluid substance to be dispensed. The measuring cup 3 is suitably graduated or comprises notches indicating an amount of the substance. The dispenser 1 suitably comprises a dispenser 30 which allows the fluid substance present in the measuring cup 3 to be dispensed. Thereby, the fluid substance can exit from the dispenser 1. Such a dispenser 30 can be occluded by a cover 8. The cover 8 is therefore openable. The measuring cup 3 is interposed between the cover 8 and the container 2. Preferably, the graduated scale has increasing numerical references as it moves away from the cover 8 (this is to facilitate reading once the dispenser 1 has been turned upside down, placing the cover down to allow the passage by gravity of the fluid substance from the container 2 to the measuring cup 3). If necessary, the graduated scale could have numerical references readable in two opposite directions or in any case it could have two graduated scales readable alternatively to each other depending on whether the measuring cup 3 is higher or lower with respect to the container 2. Suitably, the cover 8 comprises a flat base 80. This allows to support the dispenser 1 by adopting the cover 8 as the lower support.

Suitably, the cover 8 comprises a cap 81 which defines a projection which protrudes from the base 80. With the cover 8 closed, the cap 81 is suitable for occluding the dispenser 30, possibly by engaging therein. Suitably, the cover 8 could be of the "child proof" type. For example, the cover 8 could have unlocking elements which are located on two opposite sides.

Suitably, the opening of the cover 8 could require the simultaneous compression of two typically opposite areas of the cover 8.

The measuring cup 3 suitably defines an internal dosing chamber 300.

The fluid substance withdrawn from the container 2 is placed in such a chamber 300, waiting to be dispensed by the dispenser 30. Suitably, the measuring cup 3 comprises an external annular wall 31. A gap 32 is interposed between the external annular wall 31 and the internal dosing chamber 300. This allows to have a narrower transverse section of the internal dosing chamber 300 than that delimited by the external wall 31. Thereby, the graduated scale can more easily detect the increase in height of the fluid substance inside the measuring cup 3. Suitably, the internal chamber 300 is delimited by a cylindrical wall 33.

Suitably, the measuring cup 3 is made of transparent material. In particular, the external wall 31 and/or the cylindrical wall 33 is/are transparent.

In a particular embodiment, the cover 8 could comprise a coupling area to the measuring cup 3. Suitably, the cover 8 could contribute to delimiting the chamber 300.

The dispenser 1 comprises a first line 41 for the fluid-dynamic connection between the measuring cup 3 and the container 2 for the transit of the fluid substance.

The dispenser 1 comprises a second line 42 for the fluid-dynamic connection between the measuring cup 3 and the container 2 for the transit of air. The second line 42 is an air vent line. It allows to compensate for the passage of the fluid substance between the container 2 and the measuring cup 3 with a movement in an opposite air direction.

Figures 3, 4:
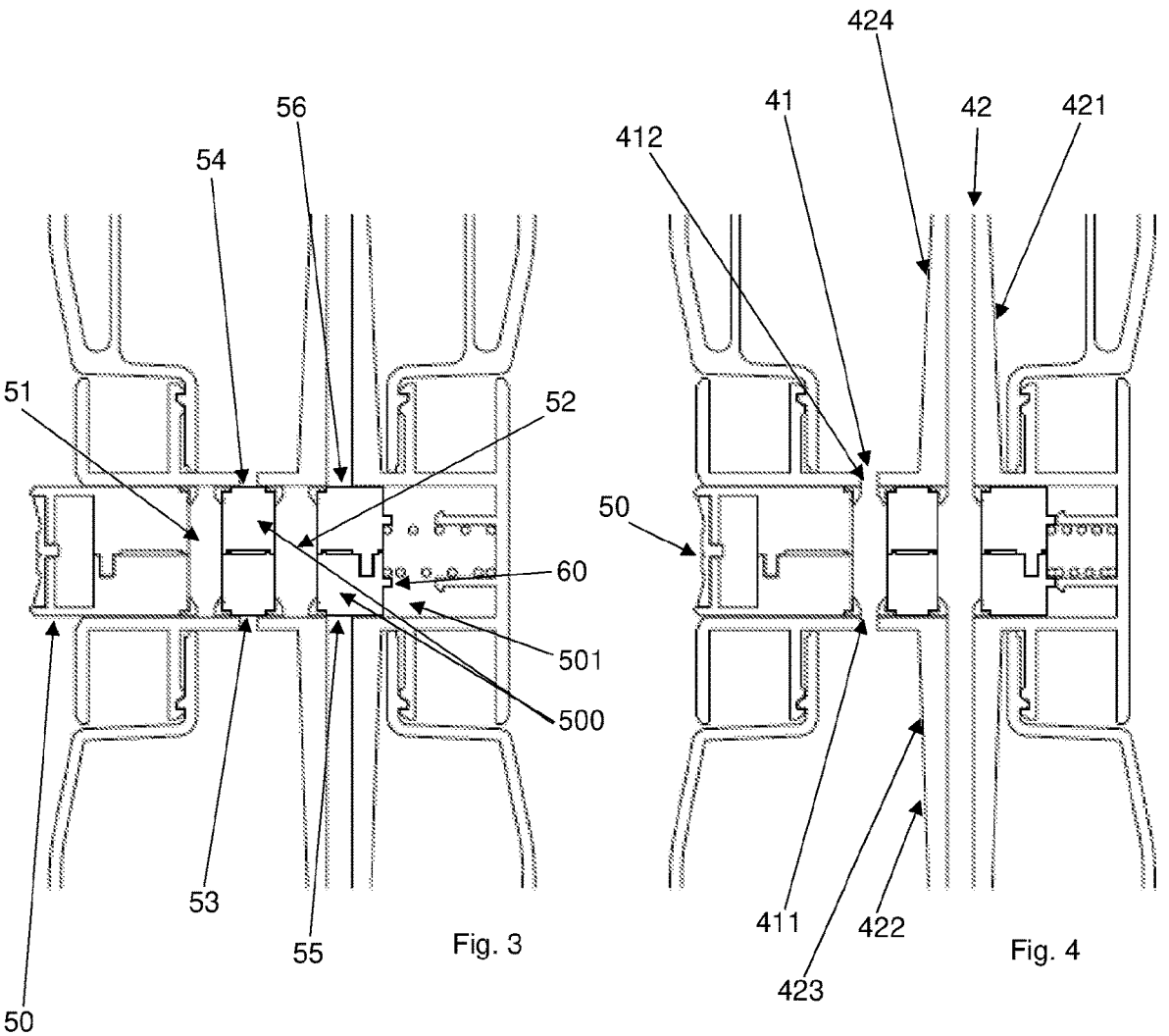
FIGS. 3 and 4 show two distinct configurations of the dispenser of FIG. 1.
Figures 5, 6:
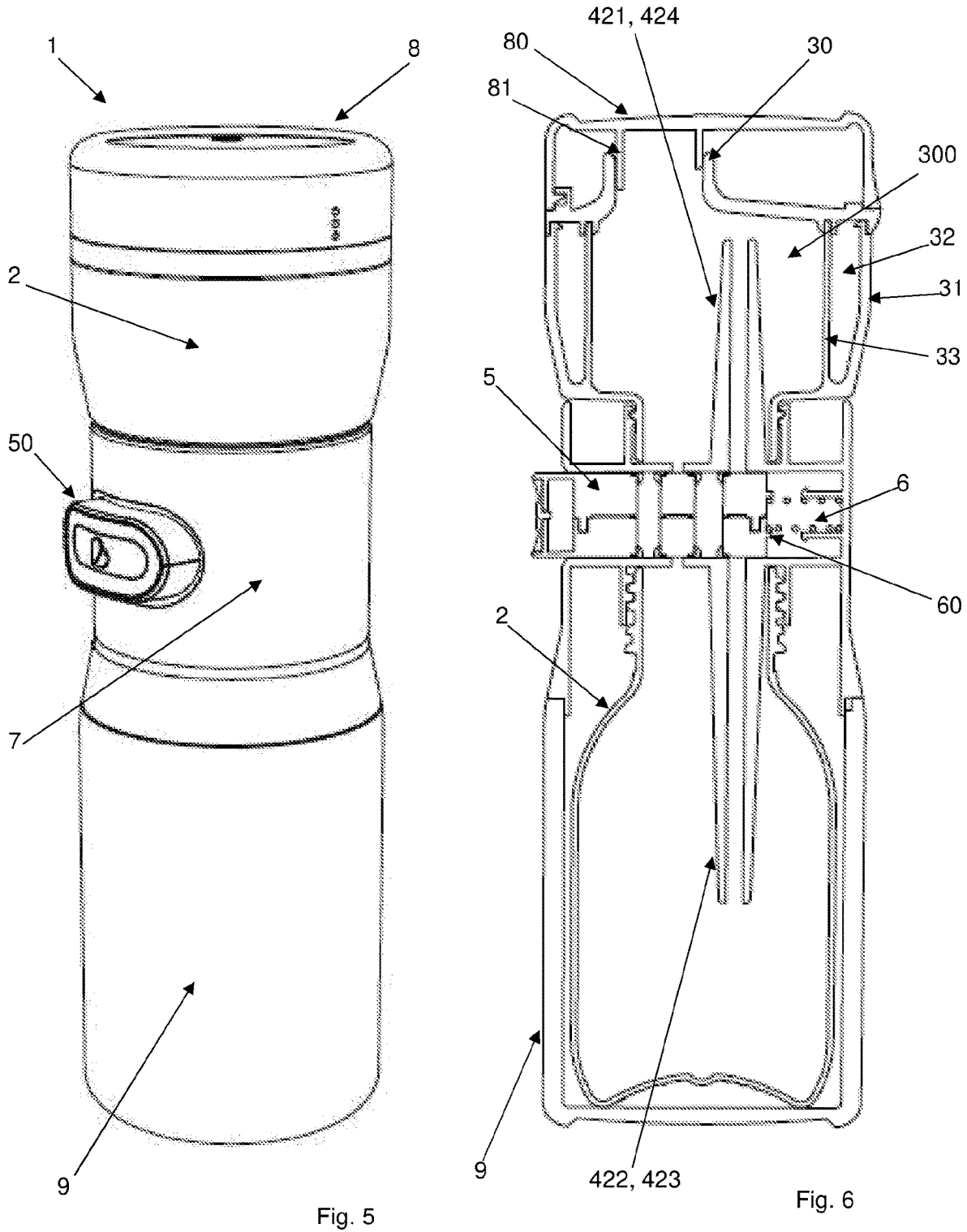
FIG. 5 shows a perspective view of a dispenser according to the present invention as an alternative to that of FIG. 1.
FIG. 6 shows a sectional view of the dispenser of FIG. 5.

The dispenser 1 comprises a valve 5 which is movable between a first configuration and a second configuration. In the first configuration the valve 5 allows the fluid-dynamic connection between the container 2 and the measuring cup 3 by means of the first and the second connection line 41, 42 (see FIG. 4). In the second configuration, the valve 5 prevents the fluid-dynamic connection between the container 2 and the measuring cup 3 by means of the first and the second connection line 41, 42 (see FIGS. 2, 3, 6). The valve 5 is suitably a slide valve, but could also be of another type.

The dispenser 1 comprises an operation actuator 50 for operating the valve 5. The actuator 50 can be operated by a user. Suitably, the actuator 50 is directly accessible from the outside of the dispenser 1. Typically the actuator 50 is a mechanical actuator. Advantageously, it is a button. A compression of the actuator 50 towards the interior of the dispenser 1 causes the passage from the second to the first configuration. Suitably, the button is movable towards the interior of the dispenser to cause from the second to the first configuration.

Suitably. the dispenser 1 has a preponderant longitudinal extension direction. The button to allow the valve 5 to pass from the second to the first configuration is movable along a direction orthogonal to a direction identified by said preponderant longitudinal extension direction.

If necessary, the actuator 50 (solution not illustrated) could be a lever.

The second line 42 comprises a first funnel 421 which extends in the measuring cup 3. Suitably, the first funnel 421 extends along a straight direction. Suitably, the first funnel 421 extends for at least three centimetres.

Suitably, the first funnel 421 extends in the measuring cup 3.

Advantageously, the first funnel 421 affects at least 50% of the height of the measuring cup 3.

Advantageously, the second line 42 comprises a second funnel 422. The second funnel 422 protrudes in the container 2. Preferably, the second funnel 422 affects at least 50% of the height of the container 2. Suitably, the second funnel 422 extends along a straight direction. Suitably, it extends for at least three centimetres. In the first configuration, the valve 5 aligns with the first and the second funnel 421, 422, allowing the transit of air along the second line 42.

The valve 5 comprises a first and a second passage hole 51, 52. In the first configuration, the first passage hole 51 aligns with the first line 41 and the second passage hole 52 aligns with the second line 42. In the second configuration, the first passage hole 51 is misaligned with the first line 41 and the second passage hole 52 is misaligned with the second line 42.

The first and the second line 41, 42 are therefore interrupted. This prevents the fluid substance from transiting between the measuring cup 3 and the container 2. In particular, the first line 41 comprises a first section 411 which always remains in fluid communication with the container 2 and a second section 412 which always remains in fluid communication with the measuring cup 3. In the first configuration, the first passage hole 51 allows the fluid communication between the first and the second section 411, 412. In the second configuration, the valve 5 occludes the first and/or the second section 411, 412. In this regard, the valve 5 comprises a first wall 53 which in the second configuration overlaps the first section 411 and a second wall 54 which in the second configuration overlaps the second section 412.

Suitably, the second line 42 comprises a first duct 423 which is always in fluid communication with the container 2. Suitably, the second line 42 comprises a second duct 424 which is always in fluid communication with the measuring cup 3. In the first configuration, the second passage hole 52 allows the fluid communication between the first and the second duct 423, 424. In the second configuration, the valve 5 occludes the first and/or the second duct 423, 424. In this regard, the valve 5 comprises a first portion 55 which in the second configuration overlaps the first duct 423 (occluding it) and a second portion 56 which in the second configuration overlaps the second duct 424 (occluding it).

As mentioned above, the valve 5 comprises a drawer 500 in which the first and the second passage holes 51, 52 are made. The first and the second passage hole 51, 52 cross the drawer from side to side.

The first and the second passage hole 51, 52 are at a mutual distance which is fixed. Such a distance is also unchanged in both the first and the second configuration.

The valve 5 alone is able to control both the first and the second line 41, 42.

The dispenser 1 advantageously comprises elastic means 6 which spontaneously moves the valve 5 from the second towards the first configuration. This is for the benefit of safety. In the absence of an explicit user command, the passage of the fluid substance between the container 2 and the measuring cup 3 is therefore prevented. Suitably, the dispenser 1 comprises an abutment 60 which in the second configuration stops the movement of the valve 5 from the first to the second configuration.

As exemplified in the accompanying figures, the dispenser 1 comprises a connector 7 to which the container 2 and the measuring cup 3 are constrained on opposite sides. Suitably, the connector 7 comprises a single monolithic body to which the container 2 and the measuring cup 3 are constrained.

Suitably, the container 2 and the connector 7 are mutually connected by means of a removable or immovable connection system. For example, the container 2 and the connector 7 are mutually connected by threaded means or by means of a snap connection. Suitably, the measuring cup 3 and the connector 7 are connected to each other by means of a removable or immovable connection system. For example, the measuring cup 3 and the connector 7 are mutually connected by threaded means or by means of a snap connection. Suitably, the connector 7 can be inscribed in an imaginary cylinder with a diameter less than 10 centimetres. In particular, the connector 7 has a diameter less than 10 centimetres. This is to facilitate a one-handed grip and the operation of the actuator 50.

Suitably, the dispenser 1 can be entirely contained in a cylinder with a diameter of 13 centimetres and a height of 20 centimetres. This is to facilitate ergonomics.

Suitably, in the exemplary solution of FIGS. 1-4, the container 2 is directly accessible and visible from the outside of the dispenser 1. Suitably in the solution of FIGS. 5 and 6, the dispenser 1 comprises a casing 9 for housing the container 2. The housing casing 9 advantageously comprises two half-shells. The casing 9 is advantageously openable, for example to allow an inspection or a replacement of the container 2. Suitably, the container 2 is not visible from the outside of the dispenser 1. Suitably, the casing 9 is connected to the connector 7.

The valve 5 is integrated in the connector 7. The connector 7 suitably defines a housing 501 of the valve 5. Such a housing 501 defines a guide for the valve 5 in the movement between the first and the second configuration.

Operatively during use, the valve 5 is moved from the second to the first configuration and the measuring cup 3 is placed below the container 2. Thereby, the fluid substance present in the container 2 will flow by gravity into the measuring cup 3 (transiting along the first line 41). This is suitably accompanied by a movement of air from the measuring cup 3 to the container 2 to facilitate the outflow of the fluid substance. In fact, the measuring cup 3 is closed towards the outside of the dispenser if the dispenser 30 is closed. After having introduced the predetermined amount of fluid substance into the measuring cup 3, the valve 5 is positioned in the second configuration. Suitably, this occurs spontaneously by releasing the actuator 50. The substance is dispensed through the dispenser 30 when the cover 8 is open. If an excessive amount of fluid substance is introduced into the measuring cup 3, it can be reintroduced into the container 2. In this regard, the dispenser 1 is oriented so that the measuring cup 3 is located above the container 2. By moving the valve 5 into the first configuration, the fluid substance can flow into the container 2 by means of the first line 41 by gravity. This is suitably accompanied by a movement of air along the second line 42 from the container 2 towards the measuring cup 3.

The present invention achieves important advantages.

Firstly, it allows to facilitate dispensing the product. The user can therefore perform such an operation even with only one hand. Similarly, the operation is particularly easy for people who are elderly or who have reduced hand motor capacity.

A further important advantage is that the user does not risk dirtying the surrounding environment to perform the dosage. A further important advantage is the possibility of performing a fast dosage given the presence of a line for the transit of the fluid substance and a line for the transit of air which compensates in reverse direction for the passage of the fluid substance between the container 2 and the measuring cup 3.

The invention as it is conceived is susceptible to numerous modifications and variants, all falling within the scope of the inventive concept characterised thereby. Furthermore, all the details can be replaced with other technically equivalent elements. In practice, all the materials used, as well as the dimensions, can be any whatsoever, according to need.

The invention claimed is:

1. A dispenser of a fluid substance comprising:
   a container (2) of the fluid substance;
   a measuring cup (3) for dosing the fluid substance to be dispensed;
   a first line (41) for a fluid-dynamic connection between the measuring cup (3) and the container (2) for a transit of the fluid substance;
   a second line (42) for a fluid-dynamic connection between the measuring cup (3) and the container (2) for a transit of air;
   a valve (5) movable between a first configuration in which the valve (5) allows the fluid-dynamic connection between the container (2) and the measuring cup (3) by means of the first and the second line (41, 42) and a second configuration in which the valve (5) prevents the fluid-dynamic connection between the container (2) and the measuring cup (3) by means of the first and the second line (41, 42); the valve (5) comprising a first and a second passage hole (51, 52); in the first configuration the first passage hole (51) aligning with the first line (41) and the second passage hole (52) aligning with the second line (42); in the second configuration the first passage hole (51) being misaligned with the first line (41) and the second passage hole (52) being misaligned with the second line (42);
   an actuator (50) for operating the valve (5), said actuator (50) being operable by a user.

2. The dispenser according to claim 1, characterised in that the second line (42) comprises a first funnel (421) which protrudes in the measuring cup (3).

3. The dispenser according to claim 1, characterised in that a first funnel (421) extends in the measuring cup (3) affecting at least 50% of a height of the measuring cup (3).

4. The dispenser according to claim 2, characterised in that the second line (42) comprises a second funnel (422) which extends in the container (2), in the first configuration the valve (5) putting the first and the second funnel (421, 422) in communication and allowing the transit of air along the second line (42).

5. The dispenser according to claim 1, characterised in that said valve (5) comprises a drawer (50) in which the first and the second passage hole (51, 52) are obtained; the first and the second passage hole (51, 52) crossing the drawer (50) from side to side.

6. The dispenser according to claim 1, characterised in that the first and the second passage hole (51, 52) are located at a mutual distance which is fixed and invariable in both the first and the second configuration.

7. The dispenser according to claim 1, characterised in that the dispenser comprises an elastic means (6) which spontaneously moves the valve (5) from the second towards the first configuration.

8. The dispenser according to claim 1, characterised in that the dispenser comprises a connector (7) to which the container (2) and the measuring cup (3) are constrained from opposite sides; said valve (5) being integrated in said connector (7).

9. The dispenser according to claim 1, characterised in that the dispenser comprises:
   a dispenser (30) which allows dispensing the fluid substance present in the measuring cup (3) outside the dispenser (1);
   a cover (8) which allows to occlude the dispenser (30); the measuring cup (3) being at least partially interposed between the cover (8) and the container (2); a graduated scale having increasing numerical references as the graduated scale moves away from the cover (8).

10. A dispenser of a fluid substance comprising:
   a container (2) of the fluid substance;
   a measuring cup (3) for dosing the fluid substance to be dispensed;
   a first line (41) for a fluid-dynamic connection between the measuring cup (3) and the container (2) for a transit of the fluid substance;
   a second line (42) for a fluid-dynamic connection between the measuring cup (3) and the container (2) for a transit of air;
   a valve (5) movable between a first configuration in which the valve (5) allows the fluid-dynamic connection between the container (2) and the measuring cup (3) by means of the first and the second line (41, 42) and a second configuration in which the valve (5) prevents the fluid-dynamic connection between the container (2) and the measuring cup (3) by means of the first and the second line (41, 42); the second line (42) comprises a first funnel (421) which protrudes in the measuring cup (3) and a second funnel (422) which extends in the container (2); in the first configuration the valve (5) putting the first and the second funnel (421, 422) in communication and allowing the transit of air along the second line (42);
   an actuator (50) for operating the valve (5), said actuator (50) being operable by a user.

11. A dispenser of a fluid substance comprising:
   a container (2) of the fluid substance;
   a measuring cup (3) for dosing the fluid substance to be dispensed;
   a first line (41) for a fluid-dynamic connection between the measuring cup (3) and the container (2) for a transit of the fluid substance;

a second line (42) for a fluid-dynamic connection between the measuring cup (3) and the container (2) for a transit of air;

a valve (5) movable between a first configuration in which the valve (5) allows the fluid-dynamic connection between the container (2) and the measuring cup (3) by means of the first and the second line (41, 42) and a second configuration in which the valve (5) prevents the fluid-dynamic connection between the container (2) and the measuring cup (3) by means of the first and the second line (41, 42);

an actuator (50) for operating the valve (5), said actuator (50) being operable by a user;

a connector (7) to which the container (2) and the measuring cup (3) are constrained from opposite sides; said valve (5) being integrated in said connector (7).

\* \* \* \* \*